(12) United States Patent
Shin et al.

(10) Patent No.: US 8,112,203 B2
(45) Date of Patent: Feb. 7, 2012

(54) SYSTEM FOR ASSISTING FUEL-EFFICIENT DRIVING

(75) Inventors: Dong Jin Shin, Seoul (KR); Sung Suk Ko, Gyeonggi-do (KR); Kyo Ho Kim, Gyeonggi-do (KR); Myung Sup Shim, Gyeonggi-do (KR)

(73) Assignees: Hyundai Motor Company, Seoul (KR); Kia Motors Corporation, Seoul (LR)

( * ) Notice: Subject to any disclaimer, the term of this patent is extended or adjusted under 35 U.S.C. 154(b) by 517 days.

(21) Appl. No.: 12/276,622

(22) Filed: Nov. 24, 2008

(65) Prior Publication Data

US 2009/0157267 A1 Jun. 18, 2009

(30) Foreign Application Priority Data

Dec. 12, 2007 (KR) ........................ 10-2007-0129233

(51) Int. Cl.
*G06F 19/00* (2006.01)
(52) U.S. Cl. ........................................... 701/51; 477/37
(58) Field of Classification Search .................. 701/123, 701/103, 29, 54, 51, 70, 79; 477/37, 35, 477/151, 168; 73/113, 114; 180/65.2
See application file for complete search history.

(56) References Cited

U.S. PATENT DOCUMENTS

| | | | | |
|---|---|---|---|---|
| 4,280,457 A * | 7/1981 | Bloxham | .................. | 123/198 R |
| 4,647,902 A * | 3/1987 | Teshima et al. | ................ | 340/439 |
| 5,989,155 A * | 11/1999 | Wadas et al. | .................. | 477/111 |
| 6,092,021 A * | 7/2000 | Ehlbeck et al. | ............... | 701/123 |
| 6,383,117 B1 * | 5/2002 | Lee | .................. | 477/168 |
| 6,484,088 B1 * | 11/2002 | Reimer | ......................... | 701/123 |
| 6,553,301 B1 * | 4/2003 | Chhaya et al. | .................. | 701/54 |
| 6,691,025 B2 * | 2/2004 | Reimer | ........................... | 701/123 |
| 7,024,306 B2 * | 4/2006 | Minami et al. | ................ | 701/123 |
| 7,561,954 B2 * | 7/2009 | Aizawa et al. | .................. | 701/79 |
| 7,899,591 B2 * | 3/2011 | Shah et al. | ...................... | 701/30 |
| 2007/0027593 A1 * | 2/2007 | Shah et al. | ....................... | 701/30 |

FOREIGN PATENT DOCUMENTS

KR 10-2000-0025188 5/2000

* cited by examiner

*Primary Examiner* — Thomas Black
*Assistant Examiner* — Marthe Marc-Coleman
(74) *Attorney, Agent, or Firm* — Edwards Wildman Palmer LLP; Peter F. Corless

(57) ABSTRACT

A system for assisting fuel-efficient driving includes a storage unit for storing a shift pattern map, a collection unit for collecting the driving state information of a vehicle, a driving state calculation unit for calculating a current driving state and a target driving region on the basis of the information from the collection unit and the shift pattern map, and a display control unit for displaying the current driving state and the target driving region on a display to make it possible to compare the current driving state and the target driving region on the basis of at least acceleration or speed.

11 Claims, 3 Drawing Sheets

SYSTEM FOR ASSISTING FUEL-EFFICIENT DRIVING

CROSS-REFERENCE TO RELATED APPLICATION

This application claims under 35 U.S.C. §119(a) the benefit of Korean Patent Application No. 10-2007-0129233 filed Dec. 12, 2007, the entire contents of which are incorporated herein by reference.

BACKGROUND

1. Technical Field

The present invention relates to a system for assisting fuel-efficient driving that assists a driver in achieving optimum fuel economy while driving a vehicle.

2. Related Art

Due to the rise in oil prices and environmental concerns, vehicle manufacturers have conducted intensive researches to improve fuel efficiency of vehicles. Vehicle fuel efficiency depends not only on vehicle engine and transmission tuning technologies but also drivers' driving habits, such as a rapid deceleration habit or a rapid braking habit. Accordingly, recently, systems for assisting fuel-efficient driving that can advise drivers to perform fuel-efficient driving by displaying the instantaneous fuel efficiency of vehicles in the form of numerical values or graphs have been provided, as disclosed in, for example, Korean Patent Application Publication No. 2000-25188, Korean Patent No. 444351, and Korean Patent Application Publication No. 2000-25188.

However, the prior art systems provide information about the current instantaneous fuel efficiency of vehicles only in consideration of the characteristics of engines, without considering the power transmission efficiency of transmissions. For example, in the case of automatic transmission vehicles, fuel efficiency is degraded when a downshift occurs due to the increase in the opening of a throttle valve (RPM increases) or a damper clutch is not in a directly coupled state (is OFF), but the prior art systems do not take these into consideration at all.

Also, the prior art systems inform drivers of a fuel-efficient driving speed under constant-speed driving conditions, but do not provide information of acceleration or deceleration criteria for achieving fuel-efficient driving in a current driving state.

The above information disclosed in this Background section is only for enhancement of understanding of the background of the invention and therefore it may contain information that does not form the prior art that is already known in this country to a person of ordinary skill in the art.

SUMMARY

Accordingly, the present invention has been made keeping in mind the above problems occurring in the prior art, and an object of the present invention is to provide a system for assisting fuel-efficient driving that enables a driver to perform fuel-efficient driving within a range in which the power transmission efficiency of a transmission is excellent.

In order to accomplish the above object, in one aspect, the present invention provides a system for assisting fuel-efficient driving, including a storage unit for storing a shift pattern map; a collection unit for collecting the driving state information of a vehicle; a driving state calculation unit for calculating a current driving state and a target driving region on the basis of the information from the collection unit and the shift pattern map; and a display control unit for displaying the current driving state and the target driving region on a display to make it possible to compare the current driving state and the target driving region on the basis of at least acceleration or speed. Here, the target driving region includes at least one of a fast upshift region, an upshift region and a damper clutch ON region.

The fast upshift region refers to a region in which a shift to a higher gear can be rapidly achieved through a relevant upshift curve at the time of increasing a vehicle speed because the region has TPS values and vehicle speeds below the first inflection point of the upshift curve on a shift pattern map.

The upshift region refers to a region below an upshift curve in which a shift to a higher gear can be achieved at the time of the decrease in the current TPS value of a vehicle.

The damper clutch ON region refers to a region below a damper clutch ON curve at a current gear position in which a damper clutch ON state can be maintained or an OFF state can be changed to an ON state at the time of the increase in vehicle speed or decrease in the TPS value.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
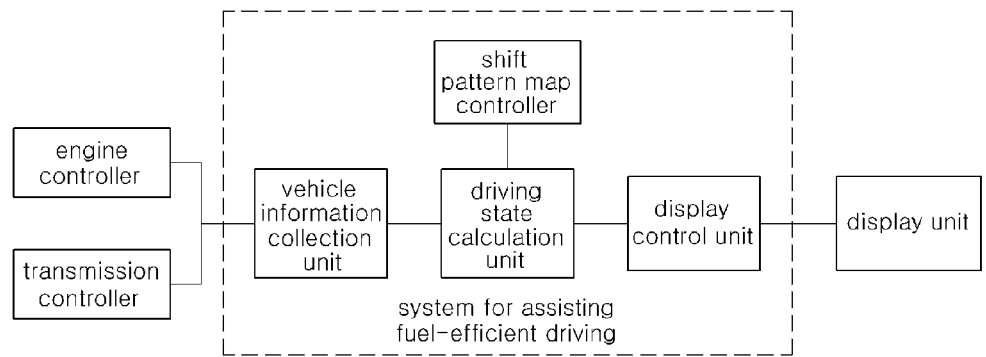
FIG. 1 is a diagram showing the construction of a system for assisting fuel-efficient driving according to an embodiment of the present invention.

Hereinafter reference will now be made in detail to various embodiments of the present invention, examples of which are described below with reference to the accompanying drawings, in which the same reference numerals are used throughout the different drawings to designate the same or similar components.

Brake Specific Fuel Consumption (BSFC) and fuel consumption, which are considered in calculating vehicle fuel efficiency, can be expressed by the following Equations:

$$BSFC = (\text{fuel consumption/power output}) \quad (1)$$

$$\text{Fuel consumption} = (BSFC \times \text{power output}) = (BSFC \times RPM \times \text{torque}) \quad (2)$$

According to Equations 1 and 2, BSFC, RPM and torque must be reduced in order to reduce fuel consumption at the time of driving a vehicle. Meanwhile, since BSFC is a value that is determined depending on the characteristics and state of an engine, it is difficult to control. Accordingly, RPM and torque can be controlled for improving the fuel efficiency. To increase the fuel efficiency, RPM, torque, or both must be reduced. A rapid shift to a higher gear must be maximized in order to reduce RPM, and the opening of a throttle valve must be minimized in order to reduce torque. As a result, a rapid shift to a higher gear coupled with minimized opening of a throttle valve will improve the fuel efficiency.

Based on the above concept, according to the present invention, a target driving region in which maximally rapid shift to a higher gear can be achieved in a current driving state is calculated using a shift pattern map, and the current driving state and the target driving region are displayed on a display in order to guide a driver to the target driving region. Since whether the current driving state is in the target driving region or in a rapid deceleration or acceleration region that departs from the target driving region is displayed on the display so that the driver can compare them on the basis of acceleration or speed, the driver can drive a vehicle within the range of the target driving region by adjusting the acceleration of the vehicle.

FIG. 1 illustrates a system for assisting fuel-efficient driving according to a preferred embodiment of the present invention.

As shown in FIG. 1, the system includes a vehicle information collection unit, a shift pattern map storage unit, a driving state calculation unit, and a display control unit.

The vehicle information collection unit collects vehicle driving information, including a vehicle speed, a Throttle Position Sensor (TPS) value, a gear position, and information whether a damper clutch is in an ON or OFF state. The vehicle driving information can be obtained from various sources. For example, the vehicle speed and the TPS value may be collected from an engine controller, and the gear position and the information about whether a damper clutch is in an ON or OFF state may be collected from a transmission controller. Also, it is apparent that these pieces of information can be obtained directly from a vehicle speed sensor and a TPS, rather than from the engine controller and the transmission controller.

The shift pattern map storage unit stores a shift pattern map that is usually stored in the transmission controller of an automatic transmission. In general, the shift pattern map may include a shift pattern data that can be represented with vehicle speed values plotted along a lateral axis and TPS values plotted along a vertical axis. The driving state calculation unit calculates the current driving state of a vehicle and a target driving region on the basis of the shift pattern map and the information collected by the vehicle information collection unit. The current driving state may be indicated by a position on the shift pattern map, and a target driving region in which a shift to a higher gear can be rapidly performed in the current driving state is calculated. The target driving region includes at least one of a fast upshift region, an upshift region, and a damper clutch ON region. These regions will be described in detail below with reference to FIG. 2.

The display control unit displays the current driving state and the target driving region, calculated by the driving state calculation unit, on a display in order for a vehicle driver to compare them on the basis of acceleration or speed. The information that is displayed on the display will be described below with reference to FIGS. 3 to 5.

Figure 2:
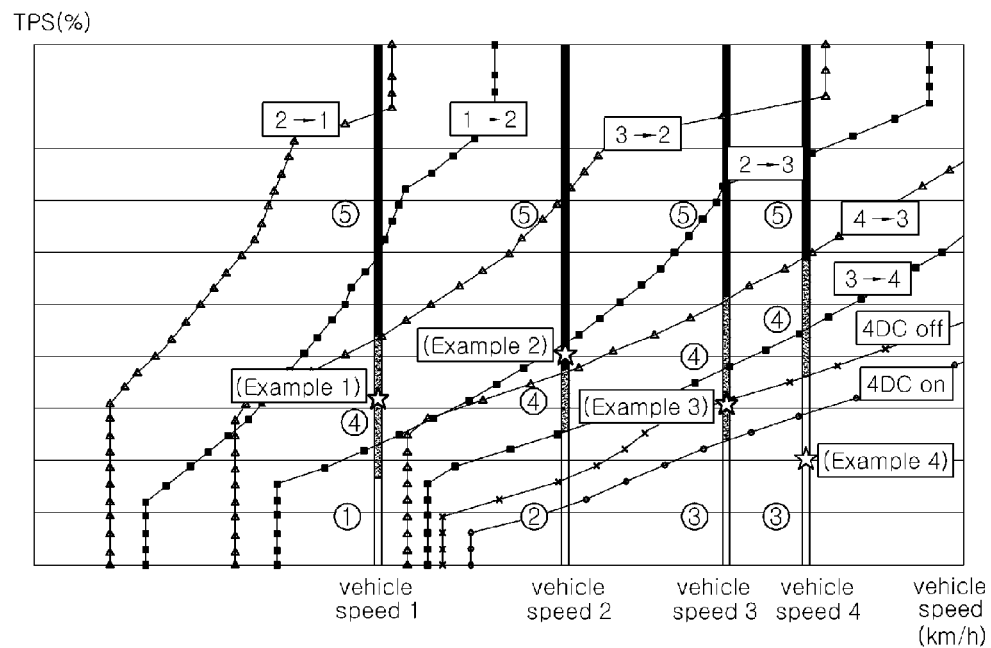
FIG. 2 is a shift pattern map illustrating a control logic of a system for assisting fuel-efficient driving according to an embodiment of the present invention.

FIG. 2 shows a shift pattern map illustrating a process of obtaining a target driving region.

As shown in FIG. 2, a shift time and a damper clutch ON/OFF time data according to the vehicle driving state data may be represented on the shift pattern map using a plurality of shift curves and damper clutch ON/OFF curves. Although the shift pattern of a four-speed transmission is illustrated in FIG. 2, the shift pattern map of a higher-speed transmission may be depicted in a manner similar to that of FIG. 2. In FIG. 2, shift curves 1→2, 2→3 and 3→4 are upshift curves, while shift curves 2→1, 3→2 and 4→3 are downshift curves.

In FIG. 2, assuming that a vehicle is currently driving at a vehicle speed 1, a region denoted by ① is a fast upshift region in which a shift to a higher gear can be achieved in the shortest time. That is, the fast upshift region (in which fuel efficiency is highest) denoted by ① at the vehicle speed 1 has TPS values and vehicle speeds below the first inflection point of the upshift curve 3→4 (currently, at a third gear position), so that the driving state of a vehicle passes through shift curve 3→4, thus resulting in a rapid shift to a fourth gear position. Furthermore, in the state of the vehicle speed 1, a region denoted by ④ is a clutch OFF region in which a damper clutch is turned off and a shift to a lower gear does not occur (fuel efficiency is low), and a region denoted by ⑤ is a red region in which a TPS value is significantly higher than a current vehicle speed, and thus a shift to a lower gear occurs (fuel efficiency is lowest).

Accordingly, if it is determined that the current driving state of a vehicle is in a region denoted by ④ at the vehicle speed 1 (in FIG. 2, denoted by "Example 1" together with a star sign), the driving state calculation unit sets the fast upshift region denoted by ① to a target driving region and advises a driver to reduce a TPS value and accelerate the vehicle, thereby achieving a shift to a higher gear. A region in which the driving state of a vehicle is denoted by ⑤ is a rapid acceleration or red region in which fuel efficiency is lowest, in which region a driver is advised to reduce a TPS value.

Assuming that a vehicle is currently driving at a vehicle speed 2, a region below the upshift curve 3→4 denoted by ② is a fast shift region in which a shift to a higher gear can be achieved through a reduction in TPS value at the current vehicle speed 2 (fuel efficiency is excellent). If it is determined that the current driving state of a vehicle is in a region denoted by ④ at the vehicle speed 2 or in a region denoted by ⑤ (in FIG. 2, denoted by "Example 2" together with a star sign), the driving state calculation unit selects a region below the upshift curve 3→4 denoted by ② as a target driving region, and advises a driver to reduce a TPS value, thereby achieving a shift to a higher gear.

Assuming that a vehicle is currently driving at a vehicle speed 3, a region denoted by ③ is a clutch ON region in which a shift to a higher gear is delayed and a damper clutch OFF state is changed to a damper clutch ON state at the time of the increase in vehicle speed or the decrease in TPS value (if the damper clutch is in an ON state, it is maintained in the ON state. In contrast, if the damper clutch is in an OFF state, it is turned on: fuel efficiency is excellent). If it is determined that the current driving state of a vehicle is in a region denoted by ④ at the vehicle speed 3 (in FIG. 2, denoted by "Example 3" together with a star sign) or a region denoted by ⑤, the driving state calculation unit sets a region below a damper clutch ON curve denoted by ③ as a target driving region and advises a driver to reduce an TPS value, thereby changing the damper clutch to an ON state.

Assuming that a vehicle is currently driving at a vehicle speed 4, a region denoted by ③ is a clutch ON region in which a damper clutch ON state is maintained at the time of increasing a vehicle speed. If it is determined that the current driving state of a vehicle is in a region denoted by ③ at the vehicle speed 4 (in FIG. 2, denoted by "Example 4" together with a star sign), the driving state calculation unit advises a driver to maintain the current state for fuel-efficient driving. In FIG. 2, at the vehicle speed 4, a region between damper clutch OFF and ON curves is a region in which an ON state is maintained if the damper clutch of a vehicle is in the ON state. Accordingly, the driving state of a vehicle is in this region, the driving state calculation unit checks information about whether the damper clutch of the vehicle is in an ON or OFF state, which is collected by the vehicle information collection unit, and advises the driver to maintain the driving state if the damper clutch is in an ON state, or to reduce a TPS value thereby causing the damper clutch to be directly coupled if the damper clutch is in an OFF state.

Figure 3:
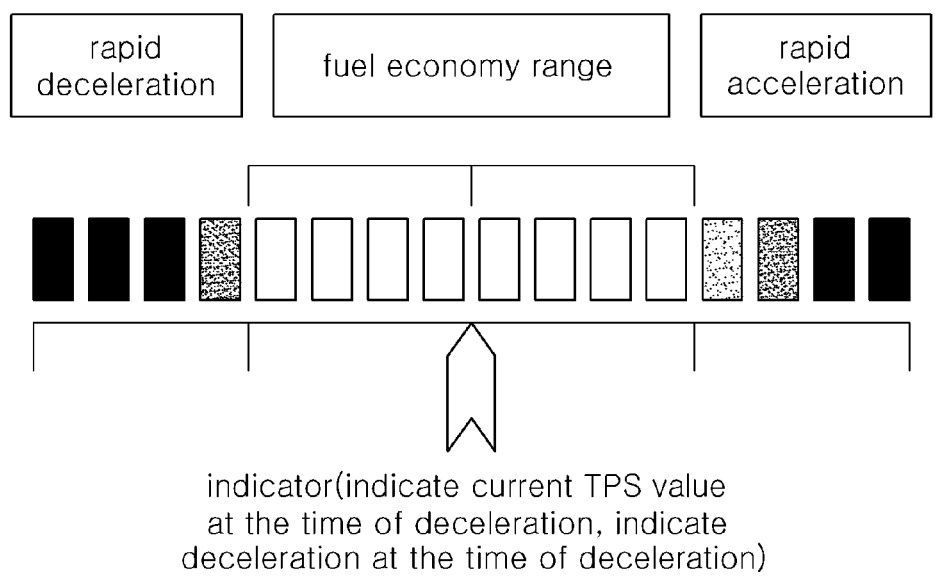
FIGS. 3 to 5 are drawings showing fuel-efficient driving guide screens according to embodiments of the present invention.
Figure 4:
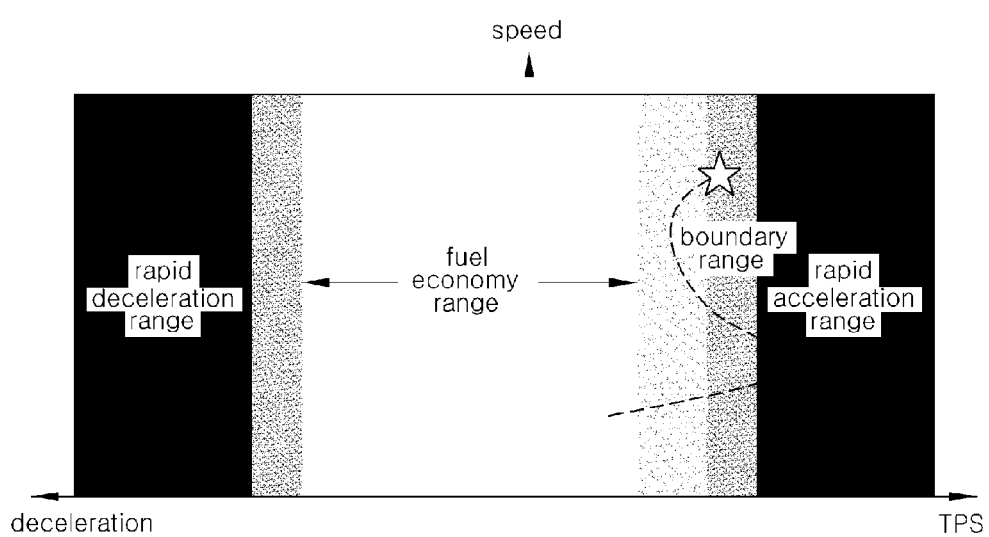
Figure 5:
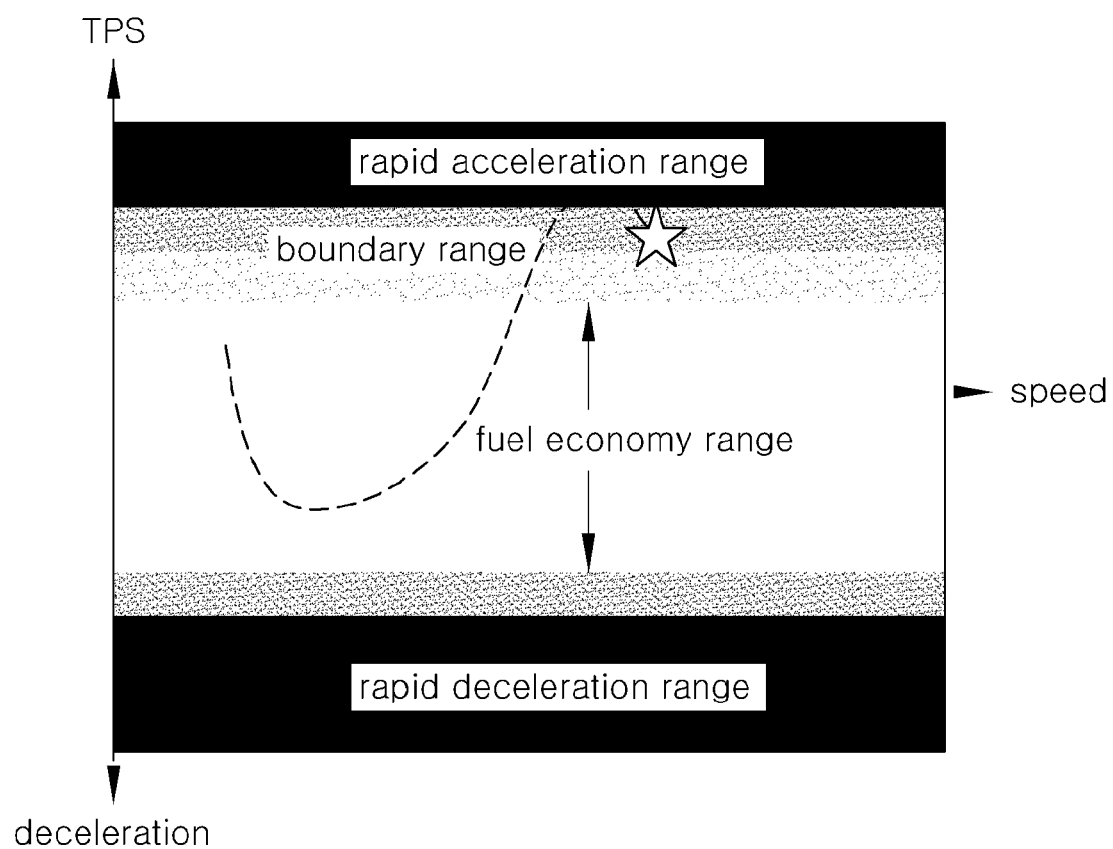

FIGS. 3 to 5 show examples in which a target driving region and a current driving state calculated by the driving state calculation unit are displayed on a display so that a driver can compare them on the basis of acceleration or speed.

FIG. 3 shows a fuel-efficient driving guide screen using an one-dimensional bar graph. In this drawing, a target fuel-efficient driving state is represented as a fuel economy range (for example, represented in green), and a non-fuel-efficient driving state is represented as a rapid deceleration or acceleration range (for example, represented in red). The current driving state of a vehicle is indicated by an indicator (in FIG. 3, indicated by a needle). Meanwhile, a driver may perform deceleration by reducing the opening of a throttle valve when it is indicated that a vehicle enters a rapid acceleration region. On the indicator, in order for the driver to easily adjust the amount of depressing of an acceleration pedal or a brake pedal, a current TPS value may be indicated at the time of acceleration, while a deceleration value may be indicated at the time of deceleration. It is apparent that it is preferred that the TPS value or the deceleration value be converted into a numerical value that can be easily read or estimated, and provided to the driver.

For example, among the above-described regions ①, ②, ③, ④ and ⑤, the regions ①, ② and ③ are selected as target driving regions and displayed on the display as fuel-efficient driving ranges, the red region ⑤ in which fuel efficiency is lowest is displayed as a rapid acceleration range, and the clutch OFF region ④ is displayed as a boundary range between a target driving region and a rapid acceleration region (for example, displayed in yellow). In the case in which the current driving state of a vehicle is changed from the region ③ to the region ④, the indicator is placed in the boundary range on the display. In the case in which the driving state is changed from the region ④ to the region ⑤, the indicator is placed in the rapid acceleration range. Preferably, an appropriate deceleration may be preset for respective vehicle speeds such that the indicator is placed in the rapid deceleration range if the current deceleration of a vehicle exceeds the preset appropriate deceleration. A driver can check, through the display, whether fuel-efficient driving is made when he or she is performing acceleration or deceleration driving, as well as he or she is performing normal driving.

FIGS. 4 and 5 show fuel-efficient driving guide screens using two-dimensional graphs. The current driving state of a vehicle is indicated by an indicator (e.g., by a dot or some other indication) on a graph having three axes, that is, a speed axis, a TPS axis and an acceleration axis. A driver can drive a vehicle more fuel-efficiently by adjusting the amount of depressing of the acceleration pedal or a brake pedal, by referring to such a two-dimensional graph.

The above-described systems for assisting fuel-efficient driving can provide the current driving state of a vehicle and a target driving region in which a shift pattern has been considered on a display so that a driver can make a comparison therebetween on the basis of acceleration or speed, thereby enabling the driver to perform fuel-efficient driving.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for assisting fuel-efficient driving, comprising:
a storage unit for storing a shift pattern map;
a collection unit for collecting driving state information of a vehicle;
a driving state calculation unit for calculating a current driving state and a target driving region based on the information from the collection unit and the shift pattern map, the target driving region including at least one of a fast upshift region, an upshift region, and a damper clutch ON region; and
a display control unit for displaying the current driving state and the target driving region on a display in order for a driver to compare the current driving state and the target driving region based on at least acceleration or speed,
wherein a red region in which a shift to a lower gear occurs because a current Throttle Position Sensor (TPS) value of the vehicle is higher than a current vehicle speed is displayed on the display in a color distinguishable from that of the target driving region.

2. The system as set forth in claim 1, wherein the driving state information collected by the collection unit comprises a vehicle speed, a Throttle Position Sensor (TPS) value, a gear position and information whether a damper clutch is in an ON or OFF state.

3. The system as set forth in claim 1, wherein the fast upshift region is a region that has TPS values and vehicle speeds below a first inflection point of an upshift curve on the shift pattern map, so that a shift to a higher gear is rapidly achieved through the upshift curve when a vehicle speed increases.

4. The system as set forth in claim 1, wherein the upshift region is a region below an upshift curve in which a shift to a higher gear is achieved when a current TPS value of the vehicle decreases.

5. The system as set forth in claim 1, wherein the damper clutch ON region is a region below a damper clutch ON curve at a current gear position in which a damper clutch ON state can be maintained or a damper clutch OFF state can be changed to a damper clutch ON state when a vehicle speed increases or a TPS value decreases.

6. The system as set forth in claim 1, wherein the current driving state is displayed on the display by an indicator.

7. The system as set forth in claim 6, wherein a TPS value is indicated on the indicator when the vehicle is accelerated, and a deceleration value is indicated on the indicator when the vehicle is decelerated.

8. The system as set forth in claim 1, wherein a red region in which a shift to a lower gear occurs because a current TPS value of the vehicle is higher than a current vehicle speed is displayed on the display in a color distinguishable from that of the target driving region.

9. The system as set forth in claim 1, wherein a damper clutch OFF region in which a damper clutch is turned off and a shift to a lower gear does not occur is displayed on the display in a color distinguishable from that of the target driving region.

10. A system for assisting fuel-efficient driving, comprising:
   a storage unit for storing a shift pattern map;
   a collection unit for collecting driving state information of a vehicle;
   a driving state calculation unit for calculating a current driving state and a target driving region based on the information from the collection unit and the shift pattern map, the target driving region including at least one of a fast upshift region, an upshift region, and a damper clutch ON region; and
   a display control unit for displaying the current driving state and the target driving region on a display in order for a driver to compare the current driving state and the target driving region based on at least acceleration or speed,
   wherein the fast upshift region is a region that has Throttle Position Sensor (TPS) values and vehicle speeds below a first inflection point of an upshift curve on the shift pattern map, so that a shift to a higher gear is rapidly achieved through the upshift curve when a vehicle speed increases.

11. A system for assisting fuel-efficient driving, comprising:
   a storage unit for storing a shift pattern map;
   a collection unit for collecting driving state information of a vehicle;
   a driving state calculation unit for calculating a current driving state and a target driving region based on the information from the collection unit and the shift pattern map, the target driving region including at least one of a fast upshift region, an upshift region, and a damper clutch ON region; and
   a display control unit for displaying the current driving state and the target driving region on a display in order for a driver to compare the current driving state and the target driving region based on at least acceleration or speed,
   wherein the current driving state is displayed on the display by an indicator, and
   a Throttle Position Sensor (TPS) value is indicated on the indicator when the vehicle is accelerated, and a deceleration value is indicated on the indicator when the vehicle is decelerated.

* * * * *

Disclaimer

8,112,203 B2 — Dong Jin Shin, Seoul (KR); Sung Suk Ko, Gyeonggi-do (KR); Kyo Ho Kim, Gyeonggi-do (KR); Myung Sup Shim, Gyeonggi-do (KR). SYSTEM FOR ASSISTING FUEL-EFFICIENT DRIVING. Patent dated February 7, 2012. Disclaimer filed May 17, 2016, by the assignee.

Hereby disclaim complete claims 1-11 of said patent.

*(Official Gazette, June 14, 2016)*